United States Patent
Egolf et al.

(10) Patent No.: US 12,516,886 B2
(45) Date of Patent: Jan. 6, 2026

(54) TUBULAR MEMBRANE HEAT EXCHANGER

(71) Applicant: Baltimore Aircoil Company, Inc., Jessup, MD (US)

(72) Inventors: Kevin Ellsworth Egolf, Hampstead, MD (US); Yohann Lilian Rousselet, Baltimore, MD (US)

(73) Assignee: Baltimore Aircoil Company, Inc., Jessup, MD (US)

( * ) Notice: Subject to any disclaimer, the term of this patent is extended or adjusted under 35 U.S.C. 154(b) by 467 days.

(21) Appl. No.: 18/193,425

(22) Filed: Mar. 30, 2023

(65) Prior Publication Data

US 2023/0235965 A1 Jul. 27, 2023

Related U.S. Application Data

(62) Division of application No. 16/891,598, filed on Jun. 3, 2020, now Pat. No. 11,624,558.

(Continued)

(51) Int. Cl.
*F28D 7/00* (2006.01)
*B01D 69/10* (2006.01)
(Continued)

(52) U.S. Cl.
CPC ............ *F28D 7/0066* (2013.01); *B01D 69/10* (2013.01); *B01D 2313/23* (2013.01);
(Continued)

(58) Field of Classification Search
CPC ... B01D 2313/23; B01D 69/10; F16L 41/082; F28D 1/05316; F28D 21/0015;
(Continued)

(56) References Cited

U.S. PATENT DOCUMENTS

| 2,612,350 A | 9/1952 | Stadler |
| 3,398,091 A | 8/1968 | Greatorex |

(Continued)

FOREIGN PATENT DOCUMENTS

| AU | 1248483 A | 9/1983 |
| CN | 2764471 Y | 3/2006 |

(Continued)

OTHER PUBLICATIONS

"Tubular" 1 page, https://www.thefreedictionary.com/tubular, American Heritage® Dictionary of the English Language, Fifth Edition. 2016 by Houghton Mifflin Harcourt Publishing Company. Published by Houghton Mifflin Harcourt Publishing Company. All rights reserved. (Year: 2016).

(Continued)

*Primary Examiner* — Dirk R Bass
(74) *Attorney, Agent, or Firm* — Fitch, Even, Tabin & Flannery LLP (57) ABSTRACT

In one aspect, a tubular membrane assembly is provided for a heat exchanger. The tubular membrane assembly includes a header having a header body, a tubular membrane, and a fitting connecting the tubular membrane to the header body. The fitting is configured to form a fluid tight connection between the fitting and the tubular membrane. The tubular membrane assembly further includes potting of the header keeping the tubular membrane connected to the fitting.

12 Claims, 10 Drawing Sheets

Related U.S. Application Data (60) Provisional application No. 62/857,113, filed on Jun. 4, 2019.

(51) Int. Cl.
    *F16L 41/08*         (2006.01)
    *F28F 9/02*          (2006.01)
    *F28F 9/16*          (2006.01)

(52) U.S. Cl.
    CPC ........... *F16L 41/082* (2013.01); *F28F 9/0256* (2013.01); *F28F 9/162* (2013.01); *F28F 9/167* (2013.01)

(58) Field of Classification Search
    CPC . F28D 7/0066; F28F 2275/025; F28F 9/0256; F28F 9/162; F28F 9/167
    See application file for complete search history.

(56) References Cited

U.S. PATENT DOCUMENTS

| | | | |
|---|---|---|---|
| 3,447,492 A | 6/1969 | Kreimann |
| 3,480,147 A | 11/1969 | Kanyok |
| 3,494,470 A | 2/1970 | Banfield |
| 3,697,635 A | 10/1972 | Dietzsch |
| 3,707,234 A | 12/1972 | Salemi |
| 3,856,475 A | 12/1974 | Marx |
| 3,926,813 A | 12/1975 | De Putter |
| 4,117,884 A | 10/1978 | Frei |
| 4,286,653 A | 9/1981 | Edwards |
| 4,295,522 A | 10/1981 | Frei |
| 4,321,911 A | 3/1982 | Offutt |
| 4,461,707 A | 7/1984 | Thayer |
| 4,657,743 A | 4/1987 | Kanno |
| 4,802,982 A | 2/1989 | Lien |
| 4,897,359 A | 1/1990 | Oakley |
| 4,902,419 A | 2/1990 | Shibata |
| 5,058,661 A | 10/1991 | Oshiyama |
| 5,104,535 A | 4/1992 | Cote |
| 5,119,552 A | 6/1992 | Sutou |
| 5,154,832 A | 10/1992 | Yamamura |
| 5,191,771 A | 3/1993 | Meckler |
| 5,192,478 A | 3/1993 | Caskey |
| 5,355,944 A | 10/1994 | Potier |
| 5,401,406 A | 3/1995 | Johnson |
| 5,467,818 A | 11/1995 | Buckley, Jr. |
| 5,468,574 A | 11/1995 | Ehrenberg |
| 5,528,905 A | 6/1996 | Scarlatti |
| 5,540,278 A | 7/1996 | Chiba |
| 5,595,690 A | 1/1997 | Filburn |
| 5,647,227 A | 7/1997 | Lokhandwala |
| 5,846,450 A | 12/1998 | Atkinson |
| 6,038,768 A | 3/2000 | Rhodes |
| 6,110,616 A | 8/2000 | Sheikh-Ali |
| 6,126,819 A | 10/2000 | Heine |
| 6,142,219 A | 11/2000 | Korenic |
| 6,383,391 B1 | 5/2002 | Ehrenberg |
| 6,413,294 B1 | 7/2002 | Spencer |
| 6,413,298 B1 | 7/2002 | Wnek |
| 6,487,768 B2 | 12/2002 | Rhodes |
| 6,684,649 B1 | 2/2004 | Thompson |
| 6,841,601 B2 | 1/2005 | Serpico |
| 7,160,463 B2 | 1/2007 | Beck |
| 7,179,860 B2 | 2/2007 | Cao |
| 7,393,486 B2 | 7/2008 | Szabo |
| 7,468,281 B2 | 12/2008 | Kallury |
| 8,470,071 B2 | 6/2013 | Ehrenberg |
| 9,061,251 B2 | 6/2015 | Hobbs |
| 9,234,665 B2 | 1/2016 | Erb |
| 9,389,025 B2 | 7/2016 | Lowenstein |
| 9,533,261 B2 | 1/2017 | Teo |
| 9,630,147 B2 | 4/2017 | Collignon |
| 9,810,439 B2 | 11/2017 | Coutu |
| 10,302,317 B2 | 5/2019 | Erb |
| 10,352,628 B2 | 7/2019 | Erb |
| 10,712,024 B2 | 7/2020 | Lepoudre |
| 10,928,082 B2 | 2/2021 | Coutu |
| 11,092,349 B2 | 8/2021 | Lepoudre |
| 11,143,430 B2 | 10/2021 | Ghadiri Moghaddam |
| 11,408,681 B2 | 8/2022 | Lepoudre |
| 11,624,558 B2 | 4/2023 | Egolf |
| 2002/0162648 A1 | 11/2002 | Crook |
| 2004/0076871 A1 | 4/2004 | Gascoyne |
| 2008/0000629 A1 | 1/2008 | Viczena |
| 2008/0152893 A1 | 6/2008 | Stroh |
| 2010/0170776 A1 | 7/2010 | Ehrenberg |
| 2011/0062082 A1 | 3/2011 | Mordukhovich |
| 2011/0203311 A1 | 8/2011 | Wright |
| 2011/0247494 A1 | 10/2011 | Dinnage |
| 2011/0283720 A1 | 11/2011 | Martin |
| 2013/0043187 A1 | 2/2013 | Adams |
| 2013/0157164 A1 | 6/2013 | Yamauchi |
| 2013/0206658 A1 | 8/2013 | Wu |
| 2013/0312445 A1 | 11/2013 | Isetti |
| 2013/0319569 A1 | 12/2013 | Kikuno |
| 2014/0150656 A1 | 6/2014 | Vandermeulen |
| 2014/0238253 A1 | 8/2014 | Baptista |
| 2014/0251810 A1 | 9/2014 | Lepa |
| 2014/0305789 A1 | 10/2014 | Lowenstein |
| 2015/0122715 A1 | 5/2015 | Collignon |
| 2015/0233588 A1 | 8/2015 | Betts |
| 2015/0233589 A1 | 8/2015 | Betts |
| 2015/0233651 A1 | 8/2015 | Ueno |
| 2015/0300757 A1 | 10/2015 | Yang |
| 2016/0046498 A1 | 2/2016 | Caton |
| 2016/0341498 A1 | 11/2016 | Lynn |
| 2019/0346212 A1 | 11/2019 | Erb |
| 2019/0353358 A1 | 11/2019 | Allen |
| 2020/0295386 A1 | 9/2020 | Eickhoff |
| 2020/0353417 A1 | 11/2020 | Bahar |
| 2021/0060493 A1 | 3/2021 | Bahar |
| 2021/0276231 A1 | 9/2021 | Sato |
| 2021/0332993 A1 | 10/2021 | Coutu |
| 2021/0396422 A1 | 12/2021 | Ghadiri Moghaddam |
| 2022/0003437 A1 | 1/2022 | Lepoudre |
| 2022/0178619 A1 | 6/2022 | Rousselet |

FOREIGN PATENT DOCUMENTS

| | | |
|---|---|---|
| CN | 110856795 A | 3/2020 |
| DE | 69303535 T2 | 10/1996 |
| EP | 2208956 A2 | 7/2010 |
| EP | 3060856 B1 | 11/2022 |
| GB | 1151696 A | 5/1969 |
| GB | 1601429 A | 10/1981 |
| JP | S5842591 U | 3/1983 |
| JP | 5864491 A | 4/1983 |
| JP | H01269519 A | 10/1989 |
| JP | H05071882 A | 3/1993 |
| JP | 2001027496 A | 1/2001 |
| KR | 101630448 B1 | 6/2016 |
| RU | 2121393 C1 | 11/1998 |
| RU | 180307 U1 | 6/2018 |
| RU | 2711860 C1 | 1/2020 |
| RU | 195987 U1 | 2/2020 |
| WO | 2009094032 A1 | 7/2009 |
| WO | 2011150081 A2 | 12/2011 |
| WO | 2012170887 A2 | 12/2012 |
| WO | 2014029003 A1 | 2/2014 |
| WO | 2024055099 A1 | 3/2024 |

OTHER PUBLICATIONS

Electriduct ½" Heat Shrinkable Braiding Sleeving 10 ft; from Amazon https://www.amazon.com/Electriduct-Heat-Shrinkable-Braided-Sleeving/dp/B00U7UTODM; believed to be publicly available before Dec. 3, 2020; 11 pages.

Hollow Fiber Membrane Bioreactor (MBR) brochure from GreenPebble Technologies LLP at www.greenpebbletech.com/_files/ugd/e65e09_4f4c86da8e6249dc8f493c87e3185a53.pdf?index=true; believed to be publicly available before Dec. 3, 2020; 9 pages.

(56) References Cited

OTHER PUBLICATIONS

Polycoil Heat Exchanger image from http://plasticheatex.com/wp/wp-content/uploads/2015/01/IMG_7162c.jpg; believed to be publicly available before Dec. 3, 2020; 1 page.
U.S. Appl. No. 63/398,456, filed Aug. 16, 2022, entitled Tubular Membrane Heat Exchanger; 89 pages.
3M™ Liqui-Cel™ product overview printed from Internet Archive Wayback Machine https://www.3m.com/3M/en_US/liquicel-us/; publicly available before Jun. 4, 2019; 3 pages.
Abdel-Salam, Mohamed R.H., et al., State-of-the-Art in Liquid-to-Air Membrane Energy Exchangers (LAMEEs): A Comprehensive Review; Renewable and Sustainable Energy Reviews, 2014. 39: p. 700-728.
Ali, Mohamed, et al., Humidification Technique Using New Modified MiniModule Membrane Contactors for Air Cooling. Advances in Mechanical Engineering, 2013. 5: p. 174016.
Article: Haier extends nanotech cooling deal from https://www.coolingpost.com/world-news/haier-extends-nanotech-cooling-deal/; Sep. 9, 2018; 2 pages.
Bakeri, G et al.; A Porous Polyethersulfone Hollow Fiber Membrane in a Gas Humidification Process; RSC Advances, 2015; 5(19): p. 14448-14457.
Bazhenov, Stepan D., et al.; Gas-Liquid Hollow Fiber Membrane Contactors for Different Applications. Fibers, 2018. 6(4): p. 76.
Blue Frontier Ultra-Efficient, Packaged Rooftop HVAC for Commerical Buildings Summary Report from Technology Early Depolyment (TED), https://bluefrontierac.com/wp-content/uploads/2021/04/BlueFrontier-CA-TED-Summary-Report.pdf, Apr. 2021, 8 pages.
Breakthrough from the National Labs: "Desiccant Enhanced Evaporative Air Conditioning" video from https://www.youtube.com/watch?v=_3TEkCqw-64, posted Apr. 25, 2012; screen captures with transcribed audio, 10 pages.
Carbon Capture: MTR's PolarCap™ process is based on our proven Polaris™ polymeric membrane from Membrane Techology & Research, Inc. website, https://www.mtrinc.com/our-business/carbon- capture/; believed to be publicly available Nov. 2022; 7 pages.
Castro-Muñoz, Roberto et al., A new relevant membrane application: CO2 direct air capture (DAC); Chemical Enginerring Journal 446 (2022); https://www.sciencedirect.com/science/article/pii/S1385894722025396; 13 pages.
Charles, Nicholas T., et al.; The Occurrence and Characterization of Fouling During Membrane Evaporative Cooling; Journal of Membrane Science, 2008. 319(1): p. 44-53.
Chen, Dongmei, et al.; An Experimental Study and Model Validation of a Membrane Humidifier for PEM Fuel Cell Humidification Control; Journal of Power Sources, 2008. 180(1): p. 461-467.
Chen, Xiangjie, et al., Experimental Investigations of Polymer Hollow Fibre Integrated Evaporative Cooling System with the Fibre Bundles in a Spindle Shape; Energy and Buildings, 2017. 154: p. 166-174.
Chiari A.; Air Humidification with Membrane Contactors: Experimental and Theoretical Results; International Journal of Ambient Energy, 2000; 21(4): p. 187-195.
Cobetter Filtration Equipment Co., Ltd; Arrayforce ™ Membrane ontactor product overview from https://www.cobetterfiltration.com/Industries/General-Industry/Water-Treatment/Condensate-Polishing/products/Arrayforce-Membrane-Contactor.html; publicly available before Jun. 4, 2019; 3 pages.
Cui, Xin, et al., Performance Analysis of a Hollow Fiber Membrane-Based Heat and Mass Exchanger for Evaporative Cooling; Applied Energy, 2020. 271: p. 115238.
Energy-efficient graphene-based membrane cooling systems of Evercloak, Inc.; Canadian government investment in energy innovation from https://www.nrcan.gc.ca/science-and-data/funding-partnerships/funding-opportunities/current-investments/energy-efficient-graphene-based-membrane-cooling-systems/22631; Mar. 19, 2021; 4 pages.
Englart, S., An Experimental Study of the Air Humidification Process Using a Membrane Contactor; E3S Web Conf., 2017. 17: p. 00021.

Extended European Search Report from related European Patent Application No. 20819588.3 dated Jan. 4, 2023; 7 pages.
Finalist Profile of Kraton Corporation, IIT Bombay, Porus Laboratories and Infosys from https://globalcoolingprize.org/kraton-iitbombay-porus-and-infosys/; Nov. 15, 2019; 3 pages.
Hollow Fiber Membrane Manufacturing Systems brochure from MEMS website https://www.membranefilter.co.kr/hfm-system, believed to be publicly available Sep. 2021; 5 pages.
Hollow Fibre Series overview from PCI Membranes website https://www.pcimembranes.com/products/pci-hollow-fibre-series/), believed to be publicly available Sep. 2021; 4 pages.
International Search Report and Written Opinion from corresponding PCT Application No. PCT/US2020/035914 dated Aug. 14, 2020; 11 pages.
Johnson, D.W., et al.; Analysis of Heat and Mass Transfer Phenomena in Hollow Fiber Membranes used for Evaporative Cooling; Journal of Membrane Science, 2003. 227(1): p. 159-171.
Khayet, M., et al.; Modeling and Optimization of Sweeping Gas Membrane Distillation; Desalination, 2012. 287: p. 159-166.
Khayet, M., et al.; Theoretical and Experimental Studies on Desalination Using the Sweeping Gas Membrane Distillation Method; Desalination, 2003. 157(1): p. 297-305.
Khayet, Mohamed, et al.; Nature of Flow on Sweeping Gas Membrane Distillation; Journal of Membrane Science, 2000. 170(2): p. 243-255.
Khayet, Mohamed, et al.; Theory and Experiments on Sweeping Gas Membrane Distillation; Journal of Membrane Science, 2000. 165(2): p. 261-272.
Kozubal, Eric et al.; Development and Analysis of Desiccant Enhanced Evaporative Air Conditioner Protype; Technical Report NREL/TP-5500-54755 Apr. 2012; National Renewable Energy Laboratory (NREL) http://ailr.com/files/1813/9966/3295/DEVapNRELApril2012.pdf; 78 pages.
Kraton Corporation: NexarCool™ Technology video from https://www.youtube.com/watch?v=KNISA8m0oOU, posted Jan. 3, 2020; screen captures (no dialogue); 12 pages.
Kulaç, Hande; Experimental and Theoretical Aspects of Membrane Based Water Cooling System, in Department of Chemical Engineering; 2017, Middle East Technical University: Ankara, Turkey; 149 pages.
Labban, Omar, et al.; Next-generation HVAC: Prospects for an limitations of desiccant and membrane-based dehumidification and cooling; Applied Energy 200 (2017) 330-346.
Loeb, Sidney; Membrane Evaporative Cooling to 30 Degrees C or Less: 1. Membrane Evaporative Cooling of Contained Water. Ann N Y Acad Sci, 2003. 984: p. 515-27.
Mansourizadeh, A., et al.; Hollow Fiber Gas-Liquid Membrane Contactors for Acid Gas Capture: A Review; Journal of Hazardous Materials, 2009. 171(1): p. 38-53.
Membrane Filtration overview from Koch Separation Solutions website https://www.kochseparation.com/technologies/membrane-filtration/, believed to be publicly available Sep. 2021; 7 pages.
Membrane Heat and Mass Exchanger from AIL Research, Inc. website https://ailr.com/our-technology/membrane-heat-and-mass-exchanger/, accessed May 2, 2023, 7 pages.
Metz, Sybrandus Jacob; Water Vapor and Gas Transport Through Polymeric Membranes; University of Twente, Enschede, The Netherlands; 2003; 143 pages.
Microdyn Nadir Membrane Production: BIO-CEL®, screen captures from YouTube video https://www.youtube.com/watch?v=M94eD94jMk8 posted Jun. 16, 2016; 8 pages.
Modules overview from Alfa Laval Inc. website https://www.alfalaval.us/products/separation/membranes/modules/, accessed May 2, 2023; 7 pages.
Mulay, Veerendra; StatePoint Liquid Cooling system: A new, more efficient way to cool a data center; posted on Jun. 5, 2018 to Data Center Engineering, https://engineering.fb.com/2018/06/05/data-center-engineering/statepoint-liquid-cooling/, 5 pages.
Norteck Air Solutions, LLC; product brochure for StatePoint™ Liquid Cooling Data Center Technology; publicly available before Jun. 4, 2019; 2 pages.

(56) References Cited

OTHER PUBLICATIONS

NORTEK™ StatePoint overview from Nortek Air Solutions LLC website https://www.nortekair.com/product/statepoint/, publicly available before Dec. 3, 2020; 3 pages.
Pandey, Ramendra, et al.; Modelling of Water-to-Gas Hollow Fiber Membrane Humidifier; Chemical Engineering Science, 2018. 192: p. 955-971.
Park, Se-Kyu, et al.; Characteristics of Membrane Humidifiers for Polymer Electrolyte Membrane Fuel Cells; Korean Journal of Chemical Engineering, 2005. 22(6): p. 877-881.
PermSelect® Silicone Gas Exchange Membranes; Air/Gas Humidification overview printed from Internet Archive Wayback Machine http://permselect.com/markets/gas%20humidification; publicly available before Jun. 4, 2019; 1 page.
PolyCool Introduction 2018 video from https://www.youtube.com/watch?v=DPULpwa_pfA&feature=emb_logo; published May 28, 2018; 11 pages.
Portacool Jetstream Series product overview from Portacool Evaporative Coolers website https://portacool.com/jetstream-evap-coolers/; publicly available before Dec. 3, 2020; 3 pages.
Products page from PCI Membranes website https://www.pcimembranes.com/products/, believed to be publicly available Sep. 2021; 8 pages.
Qu, Ming, et al., Isothermal Membrane-Based Air Dehumidification: A Comprehensive Review; Renewable and Sustainable Energy Reviews, 2018. 82: p. 4060-4069.
Ramya, K., et al.; Study of a Porous Membrane Humidification Method in Polymer Electrolyte Fuel Cells; International Journal of Hydrogen Energy, 2011. 36(22): p. 14866-14872.
Said, Ibrahim A., et al., Sweeping Gas Membrane Distillation (SGMD) for Wastewater Treatment, Concentration, and Desalination: A Comprehensive Review; Chemical Engineering and Processing—Process Intensification, 2020. 153: p. 107960.
Smith, Benjamin D.; Sweeping Gas Membrane Evaporative Cooling for the Enhanced Performance of Vapour Compression Refrigeration; in Department of Chemical and Biological Engineering; 2010, University of Ottawa, Canada; 111 pages.
StatePoint® Indirect Cooling Technology brochure from https://www.nortekair.com/wp-content/uploads/2019/12/184F-1019-Nortek-StatePoint-Brochure.pdf; publicly available before Dec. 3, 2020; 12 pages.
Submerged PTFE Flat Sheet MBR Module overview from Membrane Solutions website https://www.membrane-solutions.com/fs_ptfe_MBR_module.htm, copyright 2022, 6 pages.
Suez Water Technologies & Solutions; ZeeWeed Ultrafiltration product guide from https://www.suezwatertechnologies.com/products/zeeweed-ultrafiltration; publicly available before Jun. 4, 2019; 3 pages.
The Membrane overview from Blue Foot Membranes website https://www.bluefootmembranes.com/the-membrane/, believed to be publicly available Sep. 2021; 2 pages.
Translation of EP2208956A2 entitled TRANSLATION-EP2208956A2 (Year: 2010); 7 pages.
Tubular UF Membrane Modules brochure from Berghof Membranes website https://www.berghofmembranes.com/tubular-uf-membrane-modules/, believed to be publicly available Sep. 2021; 7 pages.
U.S. Appl. No. 18/077,561, filed Dec. 8, 2022, entitled Tubular Membrane Mass Exchanger; 125 pages.
U.S. Appl. No. 63/464,445, filed May 5, 2023, entitled Sheet Membrane Apparatus; 36 pages.
Woods, Jason; Membrane processes for heating, ventilation, and air conditioning; Renewable and Sustainable Energy Reviews 33 (2014) 290-304.
X-Flow Tubular Membranes overview from Pentair website https://xflow.pentair.com/en/spectrum/membrane-technology-in-general/tubular-membranes, believed to be publicly available Sep. 2021; 1 page.
Xu, Y., et al., A Review on Polymer-Based Membranes for Gas-Liquid Membrane Contacting Processes: Current Challenges and Future Direction; Separation and Purification Technology, 2019; 229: p. 115791.
Yang, Minlin, et al.; Experimental Investigations of a Quasi-Counter Flow Parallel-Plate Membrane Contactor Used for Air Humidification; Energy and Buildings, 2014. 80: p. 640-644.
Zhang, Li-Zhi, et al.; Coupled Heat and Mass Transfer in a Counter Flow Hollow Fiber Membrane Module for Air Humidification; International Journal of Heat and Mass Transfer, 2011. 54(5): p. 1055-1063.
Zhao, Shuaifei, et al., Condensation Studies in Membrane Evaporation and Sweeping Gas Membrane Distillation; Journal of Membrane Science, 2014. 462: p. 9-16.
Zhao, Shuaifei, et al., Condensation, Re-Evaporation and Associated Heat Transfer in Membrane Evaporation and Sweeping Gas Membrane Distillation; Journal of Membrane Science, 2015. 475: p. 445-454.
Extended European Search Report from related European Patent Application No. 24199983.8 dated Dec. 4, 2024; 7 pages.
Chinese Office Action with machine translation from related Chinese Patent Application No. 202080043254.5 dated Mar. 29, 2024; 21 pages.
Canadian Office Action from related Canadian Patent Application No. 3,142,491 dated Nov. 7, 2023; 3 pages.
Communication under Rule 71(3) EPC from related European Patent Application No. 20819588.3 mailed May 7, 2024; 9 pages.
Office Action from related Korean Patent Application No. 2021-7043451 dated Mar. 18, 2025; 9 pages.
Notice of Reason for Refusal, with English translation from related Japanese Patent Application No. 2021-570303 dated Jul. 26, 2024; 19 pages.

TUBULAR MEMBRANE HEAT EXCHANGER

CROSS-REFERENCE TO RELATED APPLICATIONS

This application is a divisional of U.S. patent application Ser. No. 16/891,598, filed Jun. 3, 2020 which claims the benefit of U.S. Provisional Patent Application No. 62/857,113, filed Jun. 4, 2019, which are all hereby incorporated herein in their entirety.

FIELD

This disclosure relates to heat exchangers and, more specifically, to heat exchangers having tubular membranes that facilitate heat transfer between two fluids.

BACKGROUND

Heat exchangers (HX) come in a wide variety of configurations and are used in a wide variety of applications. In one approach, referred to as tubular membrane HX, tubes are inserted in tube sheets and sealed to the tube sheet using a number of methods including welding, rolling, braising and gluing (for plastic tubular membrane HX). Another approach involves potting all of the tubes at once with a tube sheet rather than gluing tubes one by one. In yet another approach, tubes together are bundled and compressed mechanically to seal the assembly.

Sealing membrane tubes can be a challenge due to the small size and large number of tubes. Further, potting a membrane tube in a tube sheet can be a challenge due to poor adhesion of the potting to the tube. Additionally, with inconsistent and/or flexible tubes, uneven gaps between tubes and tube sheets can create leaks.

Additionally, water flow rates for tubular membrane HX may be limited by sealant issues resulting in lowering the heat and mass transfer properties for the tubular membrane HX. Membrane tube-to-tube sheet seal strength, not tube and tube sheet strength, may be the limiting factor in working pressure of the heat and mass exchangers for these types of applications which in turn limits the versatility and applicability of the tubular membrane HX.

DETAILED DESCRIPTION

In one aspect, a tubular membrane assembly is provided for a heat exchanger. The tubular membrane assembly includes a header having a header body, a tubular membrane, and a fitting connecting the tubular membrane to the header body. The fitting is configured to form a fluid tight connection between the fitting and the tubular membrane. The tubular membrane assembly further includes potting of the header keeping the tubular membrane connected to the fitting. The tubular membrane assembly provides a secure connection between the header body and the tubular membrane, which may be flexible and relatively small in cross-section, and facilitates the use of fluid pressures in excess of 5 pounds per square inch (psi), such as in the range of approximately 10 psi to approximately 20 psi, or greater than 20 psi such as approximately 50 psi or greater. The durability provided by the tubular membrane assembly permits a heat exchanger to be provided with variable spacing between the tubular membranes of the heat exchanger. Variable spacing between tubular membranes facilitates the configuration of the heat exchanger to be optimized for a particular application.

In another aspect of the present disclosure, a heat exchanger is provided that includes at least one tubular membrane heat exchanger and a fan assembly operable to generate airflow relative to the at least one tubular membrane heat exchanger. The heat exchanger further includes a pump operable to pump fluid. The at least one tubular membrane heat exchanger is configured to receive the fluid and includes an inlet header, an outlet header, a plurality of tubular membranes, and fittings coupling the tubular membranes to the inlet and outlet headers. In one embodiment, the tubular membranes each have a side wall extending about a lumen of the tubular membrane. The tubular membranes provide a high ratio of effective heat and mass transfer surface area per heat and mass exchanger unit volume to provide efficient heat transfer between a fluid in the lumens of the tubular membranes and a fluid outside of the tubular membranes.

In one embodiment, the side walls of the tubular membranes are made of a material that is gas-permeable and liquid-impermeable. For example, the fluid may include a mixture of water and water vapor and the side walls of the tubular membrane permit water vapor to permeate out of the tubular membranes. The removal of the higher-energy water vapor reduces the temperature of the fluid flow in the tubular membranes. Further, the airflow generated by the fan assembly removes the water vapor from outer surfaces of the tubular membranes.

In one embodiment, the at least one tubular membrane heat exchanger may be removable from the heat exchanger to facilitate assembly of the heat exchanger as well as permit repair or replacement of the tubular membrane heat exchanger assembly.

Figure 1:
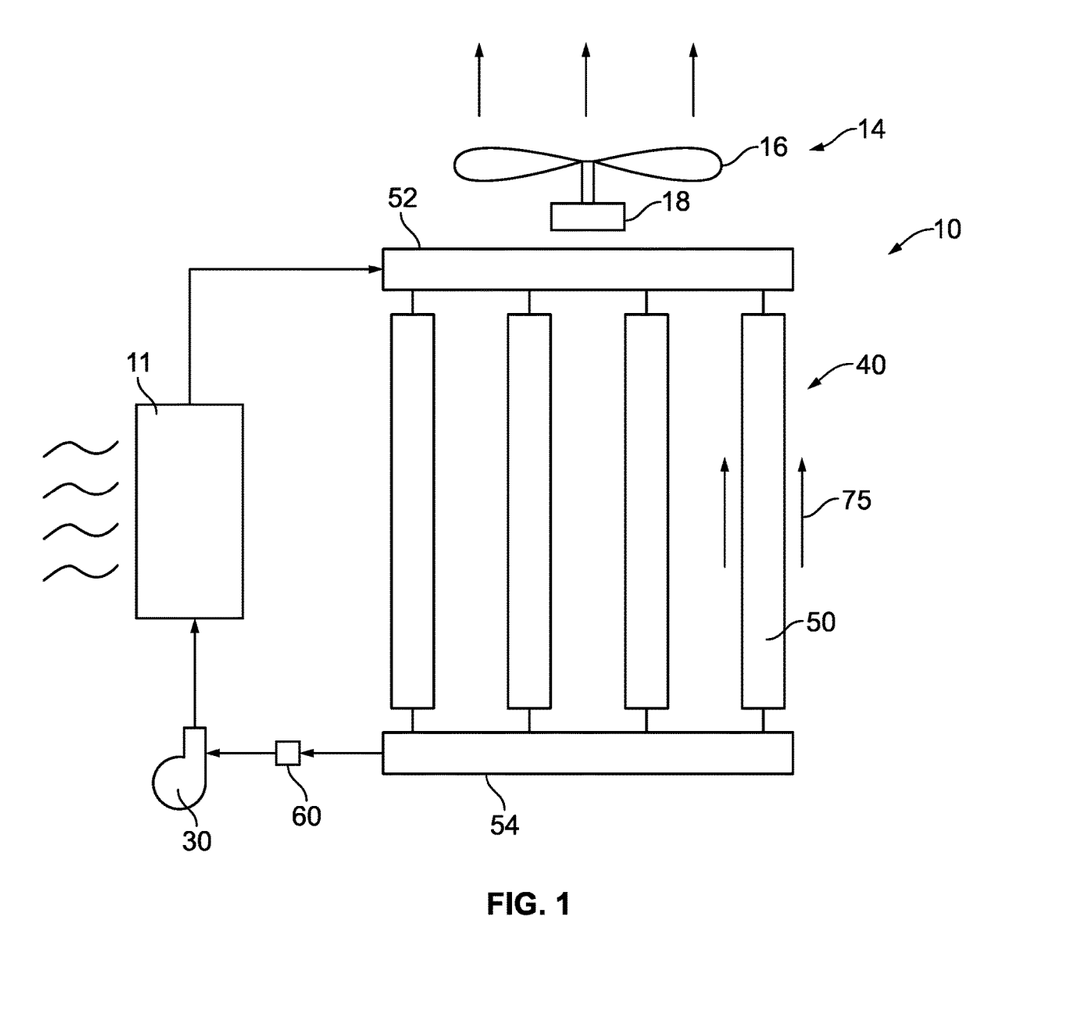
FIG. 1 is a schematic view of a heat exchanger system including tubular membrane heat exchanger assemblies.

Regarding FIG. 1, a heat exchanger system 10 is provided that includes a heat exchanger 11 that receives heat, such as heat from inside of a building, and transfers the heat to a fluid such as water or a water/glycol mixture. The fluid may include liquid and gas, the proportions of which may vary as the working fluid travels throughout the heat exchanger system 10. The heat exchanger system 10 includes a pump 12 configured to pump the fluid from the heat exchanger 11 to a heat exchanger 40. The heat exchanger 40 includes one or more heat exchanger cassettes, such as tubular membrane heat exchangers 50. The tubular membrane heat exchanger 50 are releasably or permanently connected to an inlet manifold 52 and an outlet manifold 54. In another approach, the heat exchanger 40 may receive heat and transfer the heat to the fluid, while the heat exchanger 11 removes heat from the fluid.

Figure 2:
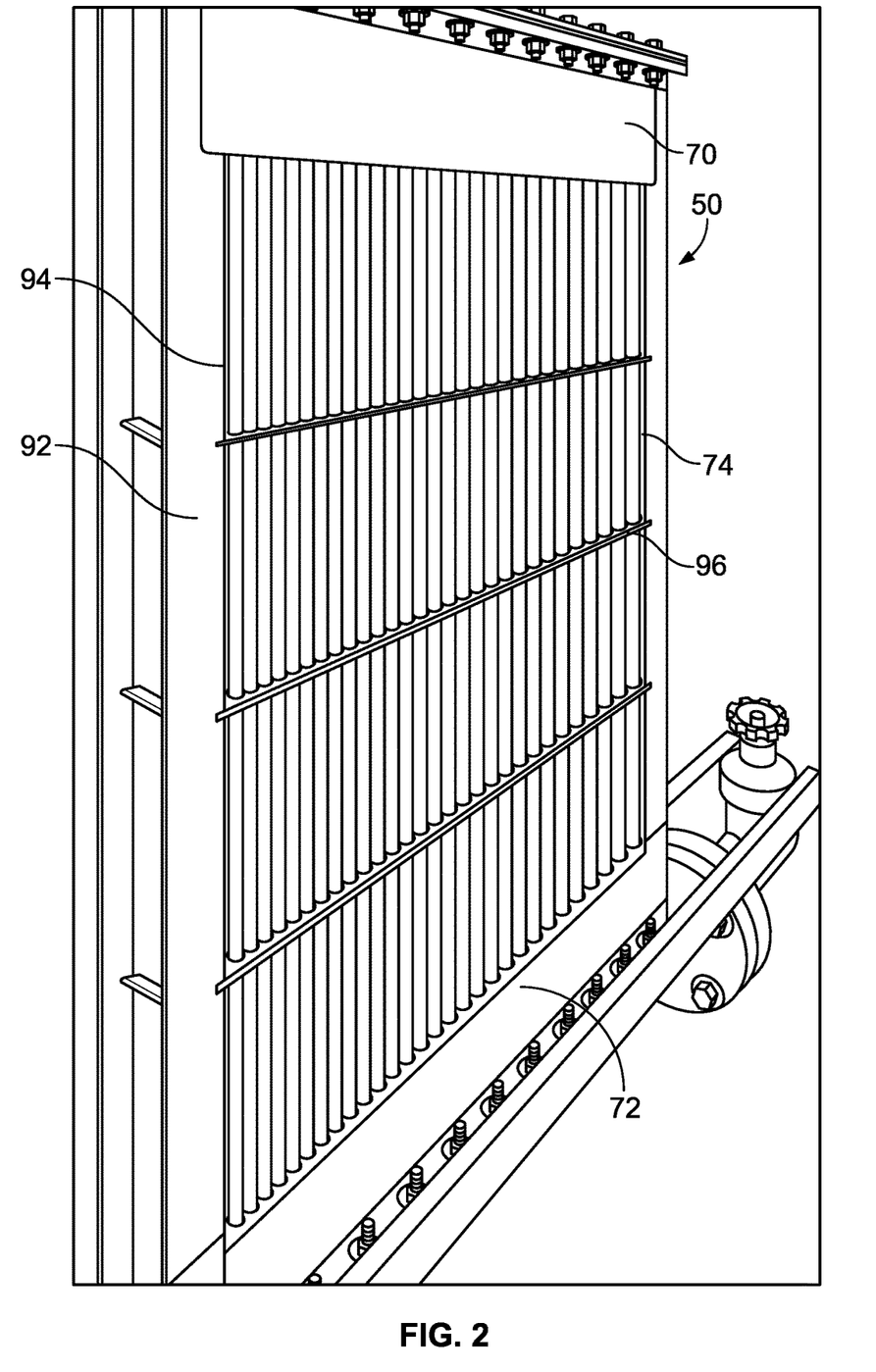
FIG. 2 is a perspective view of one of the tubular membrane heat exchanger assemblies of FIG. 1.

Regarding FIG. 2, each tubular membrane heat exchanger 50 includes an inlet header 70 that receives the fluid from the inlet manifold 52, one or more tubular membranes 74 through which the fluid travels, and an outlet header 72 that collects the fluid from the tubular membranes 74. The tubular membranes 74 facilitate heat and/or mass transfer between a first fluid within the tubular membranes 74 and a second fluid outside of the tubular membranes 74. As one example, the tubular membranes 74 may be made of a gas-permeable material that is also liquid-impermeable. The tubular membranes 74 receive fluid including a mixture of liquid and gas that has been heated by the heat exchanger 11. The tubular membranes 74 permit the gas, such as vapor, that has been heated by the heat exchanger 11 to travel out of the tubular membranes 74. As an example, the fluid entering the tubular membranes 74 may be a mixture of water and water vapor. In another approach, the fluid may be completely gas upon reaching the tubular membranes 74 and may exit the outlet header 72 as a liquid or a gas/liquid mixture.

The tubular membranes 74 may be made of, for example, one or more polymers such as polypropylene (PP), polydimethylsiloxane (PDMS) or polytetrafluoroethylene (PTFE). The tubular membranes 74 may be porous and include openings in the nanometer diameter range to facilitate heat and/or mass transfer. The tubular membranes 74 may be flexible and relatively flimsy which makes gripping the tubular membranes 74 difficult to secure to another component. For example, the tubular membranes 74 may be stiff enough to be placed vertically on a surface and retain their shape, but any external pressure makes the tubular membranes 74 bend and/or twist.

Regarding FIG. 1, the heat exchanger system 10 includes a fan assembly 14 having one or more fans 16 and one or more motors 18. The fan assembly 14 is configured to generate airflow relative to the tubular membranes 74, such as in direction 75 along the lengths of the tubular membranes 74, and/or in directions transverse to the lengths of the tubular membranes 74. The airflow may assist in removing the gas from outer surfaces 91 (see FIG. 3) of the tubular membranes 74. The fluid may be water, as mentioned above, and pure water vapor may permeate through the tubular membranes 74 while contaminants such as debris, scale, and organisms remain inside of the tubular membranes 74. Further, the tubular membranes 74 inhibit exterior contaminants from entering the tubular membranes 74.

Regarding FIGS. 1 and 2, the outlet header 72 of each tubular membrane assembly 50 directs the fluid to the outlet manifold 54. The heat exchanger system 10 includes a pump 30 configured to pump the fluid from the outlet manifold 54 to the heat exchanger 11 and throughout the heat exchanger system 10. The pump 30 may generate a gauge pressure of the fluid at the inlet header 70 in the range of approximately zero pounds per square inch (psi) to approximately 50 psi such as 5 psi or higher, 10 psi or higher, or 15 psi or higher, 20 psi or higher, 30 psi or higher, or 40 psi or higher. The heat exchanger system 10 may further include a fluid supply 60 that adds fluid, such as liquid, gas, or a liquid/gas mixture, to the system 10 to compensate for the gas permeating out of the tubular membranes 74.

Figure 3:
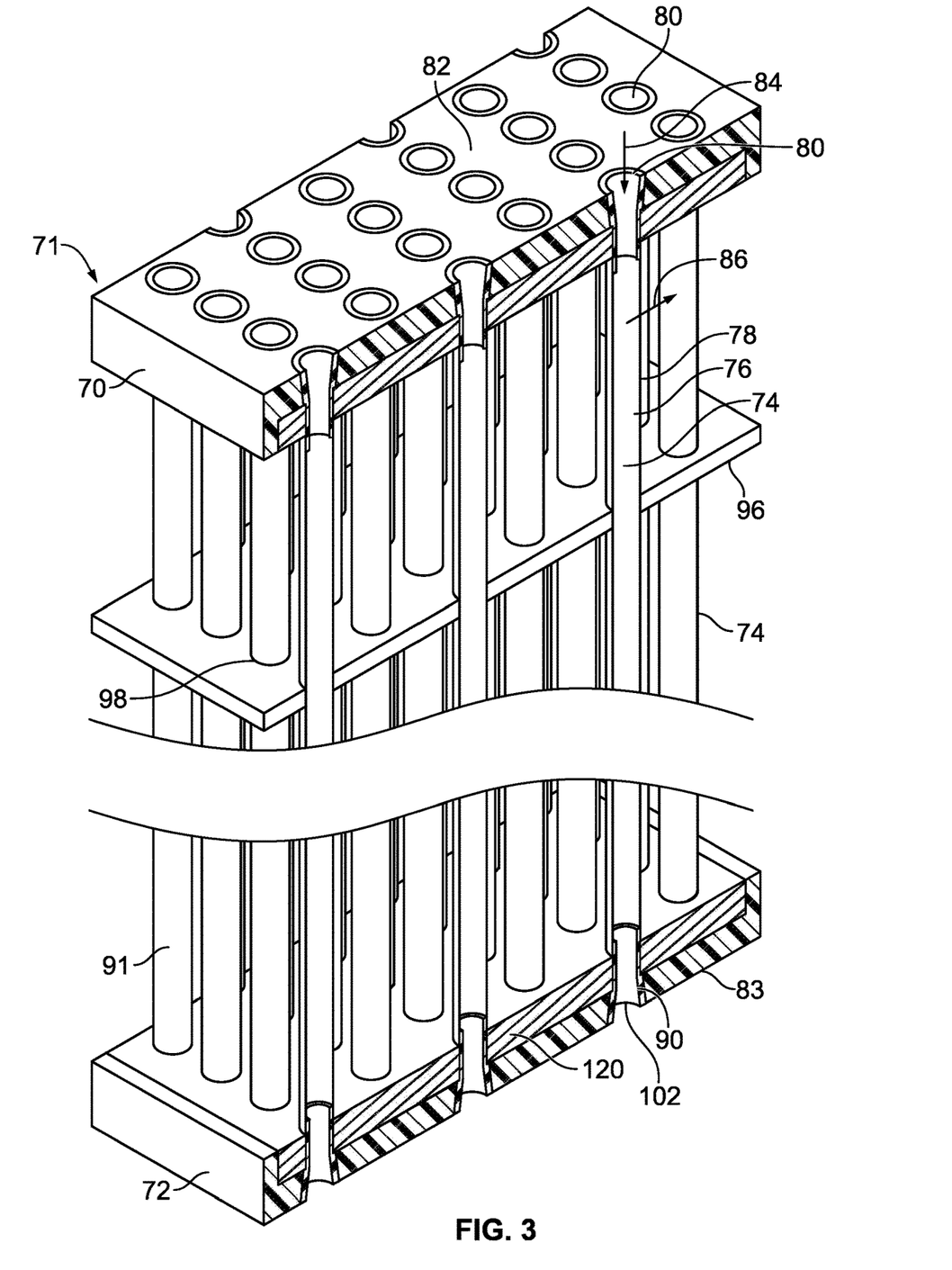
FIG. 3 is a cross-sectional view of a portion of the tubular membrane heat exchanger assembly of FIG. 2 showing tubular membranes, header bodies, fittings connecting the tubular membranes to the headers, and a spacer plate separating the tubular membranes.

Regarding FIG. 3, the tubular membranes 74 may each include an internal passageway, such as a lumen 76, and a side wall 78 extending thereabout. The lumen 76 may have an inner diameter in the range of approximately 0.1 inches to approximately 0.5 inches, such as 0.25 inches or 0.125 inches. The side wall 78 may have a thickness in the range of 1 micron to approximately 200 microns, such as approximately 1 micron to approximately 5 microns, such as approximately 5 microns to approximately 10 microns, such as approximately 10 microns to approximately 15 microns, such as approximately 15 microns to approximately 50 microns, such as approximately 30 microns, such as approximately 50 microns to approximately 75 microns, such as approximately 150 microns to approximately 200 microns. As further examples, the tubular membranes 74 may have an inner diameter less than 5 millimeters (mm), approximately 5 mm, or greater than 5 mm.

The tubular membranes 74 may be flexible and the tubular membrane heat exchanger 50 may include a support for each of the tubular membranes 74 that resists lateral movement, bending and ballooning of the tubular membrane 74. The support may extend a majority of, such as greater than 50%, 60%, 70%, 80%, 90% or substantially the entire length of the tubular membrane 74. In one embodiment, the support may include a braided sleeve surrounding the tubular membrane 74 and extending substantially the entire length of the tubular membrane 74. The braided sleeve may be made of a woven plastic or metal material that inhibits bending of the tubular membrane 74. An example braided sleeve 174 is discussed below with respect to FIG. 9. Other embodiments of the supports may include rods or other elongate guides. Yet other embodiments of the supports may include coils about the tubular membranes 74.

Regarding FIG. 3, the inlet header 70 has a header body 71 including a plate portion 82 with openings 80. The fluid in the heat exchanger system 10 may travel through the openings 80 in the plate portion 82 of the inlet header 70 generally in direction 84 and into the lumen 76 of the tubular membrane 74. The side wall 78 of the tubular membrane 74 permits gas of the fluid, such as water vapor in a fluid including water vapor and water, to permeate outward through the side wall 78 roughly in direction 86 and into contact with the air flow generated by the fan assembly 14. The liquid of the flow, such as the water, travels through the lumen 76 of the tubular membrane 74 and into the outlet header 72 via openings 90 in a plate portion 83 of the outlet header 72.

Regarding FIG. 2, the tubular membrane heat exchanger 50 have a modular configuration that permits the tubular membrane heat exchanger 50 to be individually connected to and removed from the heat exchanger system 40. The module nature of the tubular membrane heat exchanger 50 also permits the capacity of the direct heat exchanger 40 to be adjusted by adding or removing tubular membrane heat exchangers 50 and making associated changes to the volume of fluid in the system 10, capacity of the heat exchanger 11, and/or flow rate of the pump 30 as appropriate.

The tubular membrane heat exchanger 50 may include a frame 92 supporting the inlet and outlet headers 70, 72, the tubular membranes 74, and the spacers 96. The frame 92 has an opening 94 that permits air flow along and between the tubular membranes 74 to facilitate dissipation of the heated gas that has permeated through the side walls 76 of the tubular membranes 76. Regarding FIG. 3, the spacers 96 include openings 98 that receive the tubular membranes 74. The spacers 96 resist lateral shifting and bending of the tubular membranes 74 upon the tubular membranes 74 receiving pressurized fluid. The spacers 96 may also keep the tubular membranes 74 in a generally straight, parallel orientation while the tubular membranes are potted, as discussed below, which facilitates production of a gap-free connection between the potting material and the tubular membranes 74. The number and thickness of the spacers 96 may be selected so that the spacers 96 operate as supports in lieu of the sleeves 174.

Figure 4:
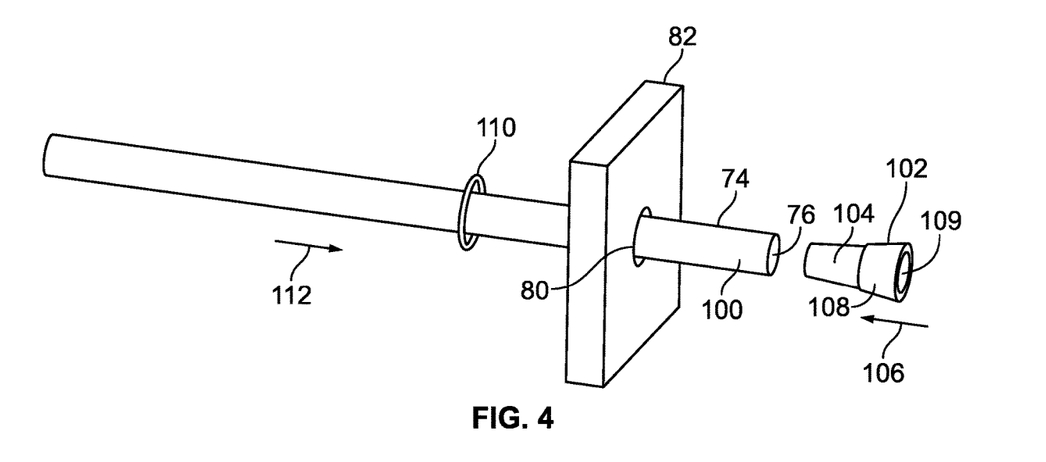
FIG. 4 is an exploded, perspective view of an end portion of one of the tubular membranes of FIG. 3 showing the tubular membrane, a fitting, a rubber band that connects the tubular membrane to the header body.

Regarding FIG. 4, the tubular membrane 74 has an end portion 100 that is connected to the plate portion 82 of the inlet header 70 via a connector, such as a fitting 102. The tubular membrane 74 is connected to the plate portion 83 of the outlet header 72 via a similar fitting 102. The fitting 102 has a nipple portion 104, a base portion 108, and a through opening that permits fluid flow through the fitting.

To assemble the tubular membrane 74 with the header plate portion 82, the nipple portion 104 is advanced in direction 106 into the lumen 76 of the tubular membrane 74. The assembled tubular membrane 74 and fitting 102 are shifted in direction 106 to seat the base portion 108 of the fitting 102 in the opening 80 of the plate portion 82. A retainer, such as a rubber band 110, may be secured to the end portion 100 of the tubular membrane 74 to keep the end portion 100 secured to the nipple portion 104 of the fitting 102. For example, the rubber band 110 may be shifted in direction 112 along the tubular membrane 74 until reaching the end portion 100. The rubber band 110 applies a compressive force on the tubular membrane 74 that holds the tubular membrane 74 tightly against the nipple portion 104 of the fitting 102. In another embodiment, the retainer may include a zip tie or a spring-biased mechanical clamp as some examples. Other examples of the retainer may include a gasket, an expanding-foam material, glue, or a combination thereof.

Figure 5:
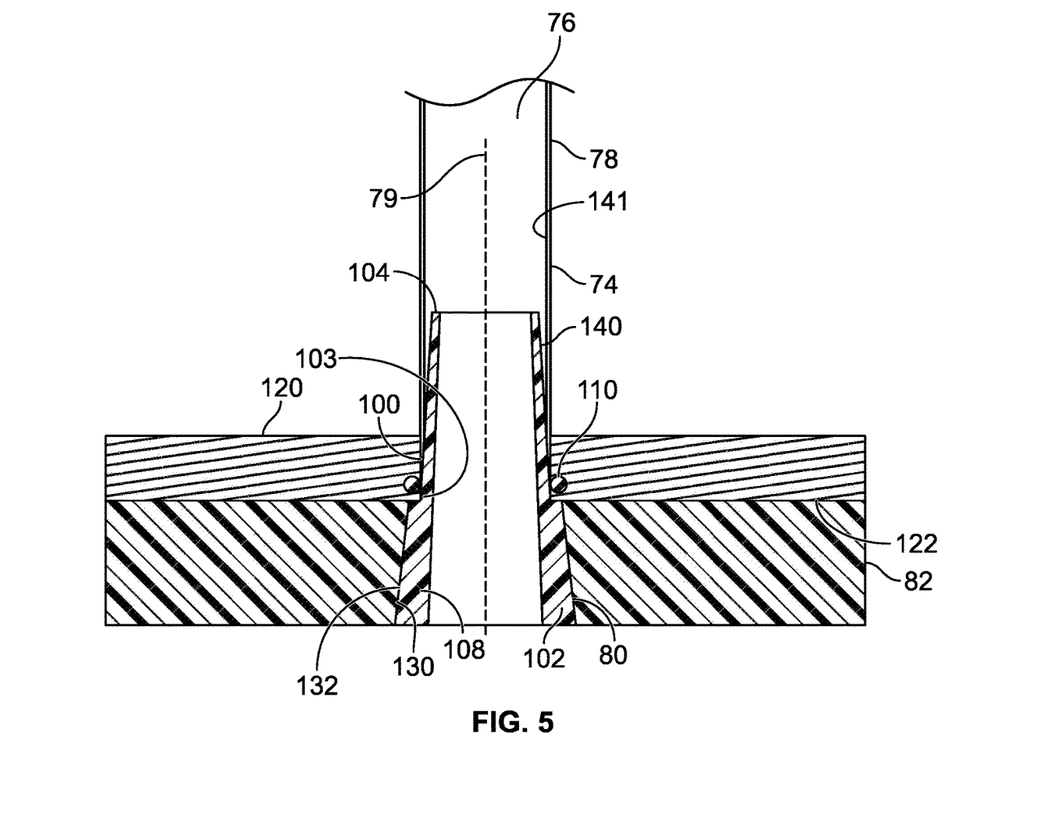
FIG. 5 is a cross-sectional view of a tubular membrane assembly including one of the tubular membranes of FIG. 3 showing potting embedding an end portion of the tubular membrane, the rubber band, and an outer surface of the header body.

Regarding FIG. 5, the tubular membrane 74, fitting 102, and rubber band 110 have been assembled to the plate portion 82. The inlet header 70 includes potting 120 that has been applied to a surface 122 of the header plate portion 82. The potting 120 may include an epoxy potting or an ultraviolet-curable silicone potting as some examples. The potting 120 embeds the end portion 100 of the tubular membrane 74 and the rubber band 110 within the potting 120 and forms a mechanical bond between the components. In some embodiments, the potting 120 forms a chemical bond with the tubular membrane 74 to further resist movement of the tubular membrane 74 relative to the potting 120.

The nipple portion 104 forms an interference fit with an inner surface 141 of the side wall 78 of the tubular membrane 74 to form a fluid-tight seal. The fitting 102 has a central axis 79 and may have a varying width taken transverse to the longitudinal axis 79 to facilitate sealing of the tubular membrane 74 and mechanical locking of the fitting 102 to the plate portion 82. In one example, the nipple portion 104 has a frustoconical outer surface 140 sized to permit the nipple portion 104 to be advanced at least partially into the lumen 76 of the tubular membrane 74 and form a fluid tight seal with the inner surface 141 of the side wall 78 of the tubular membrane 74. The fitting base portion 108 has a frustoconical surface 130 that mates with a corresponding frustoconical surface 132 of the opening 80 of the plate portion 82. The surfaces 130, 132 form a friction fit that inhibits the potting material 120 from seeping between the plate portion 82 and the fitting 102 before the potting 120 has cured. The mating engagement between surfaces 130, 132 also inhibits pull-though of the fitting 102 upon pressurization of the fluid in the system 10.

The potting 120 maintains the seal between the tubular membrane 74 and the fitting 102. As one example, the potting 120 may chemically bond with the material of the tubular membrane 74 and, once cured, inhibits movement of the tubular membrane 74. The potting 120 may also chemically bond with the bodies 82 of the inlet and outlet headers 70, 72 such as in embodiments wherein the bodies 82 are made of a polymer. In another embodiment, the potting 120 may not chemically bond with the tubular membrane 74 but the presence of the cured potting inhibits movement and/or expansion of the portion of the tubular membrane 74 engaged with the nipple portion 104 of the fitting 102. By maintaining the seal between the tubular membrane 74 and the fitting 102, the potting 120 keeps fluid from seeping between an end 103 of the tubular membrane 74 and the nipple portion 104 and expanding the end 103 due to contact with the fluid. In some embodiments, the material of the tubular membrane 74 expands when contacted by the fluid such that the contact of the potting 120 against the tubular membrane 74 keeps the tubular membrane 74 sealed to the nipple portion 104 upstream of the end 103 so the end 103 stays free of fluid and secured to the fitting 102. The potting 120 thereby keeps fluid within the lumen 76 of the tubular membrane 74 and away from the end 103 of the tubular membrane 74.

Figure 6:
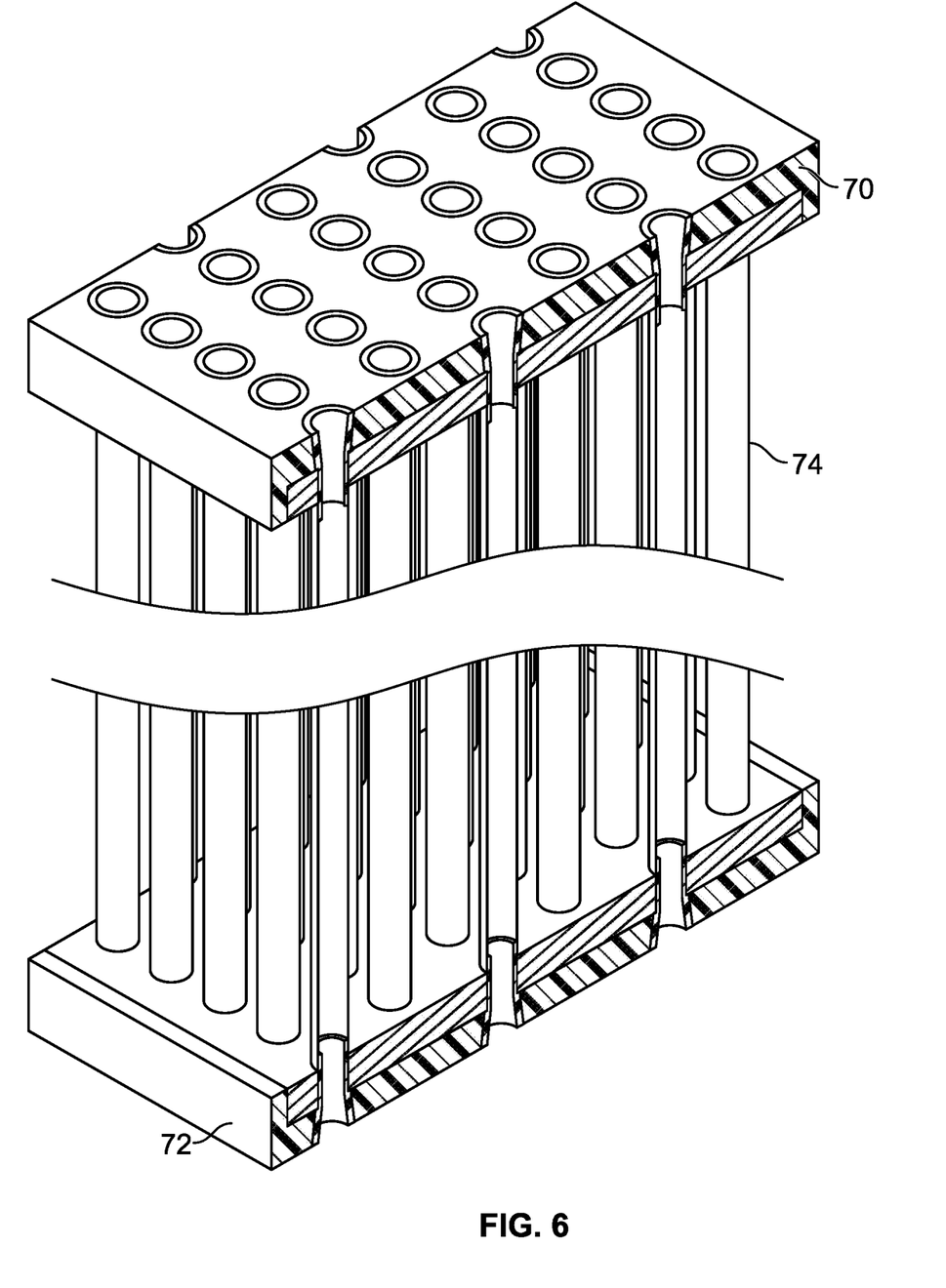
FIG. 6 is a cross-sectional view of another tubular membrane heat exchanger assembly without a spacer plate to separate the tubular membranes.

Regarding FIG. 6, in some embodiments, the tubular membrane heat exchanger assembly 50 may be provided without the spacers 96. In this form, the tubular membranes 74 extend from the inlet header 70 to the outlet header 72 without the spacers 96.

Figure 7:
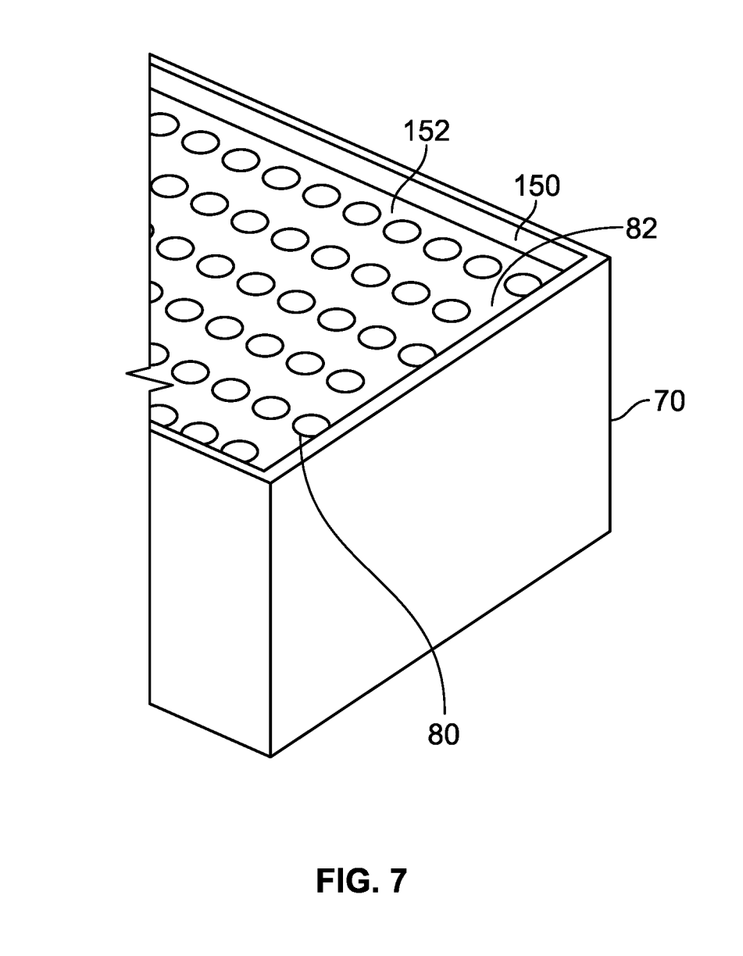
FIG. 7 is a perspective view of a header showing a plate portion of the header, openings in the plate portion for receiving tubular membranes, and a curb extending about the plate portion to retain liquid potting when the liquid potting is poured onto the header.

Regarding FIG. 7, the inlet header 70 is shown without the tubular membranes 74 attached. Although the following discussion refers to the inlet header 70, the outlet header 72 may have a similar construction. The inlet header 70 includes a curb 150 upstanding from the periphery of the plate portion 82. The curb 150 and plate portion 82 form a recess 152 for receiving liquid potting material and keeping the liquid potting material in contact with the tubular membranes 74 until the potting material has cured and solidified.

Figure 8:
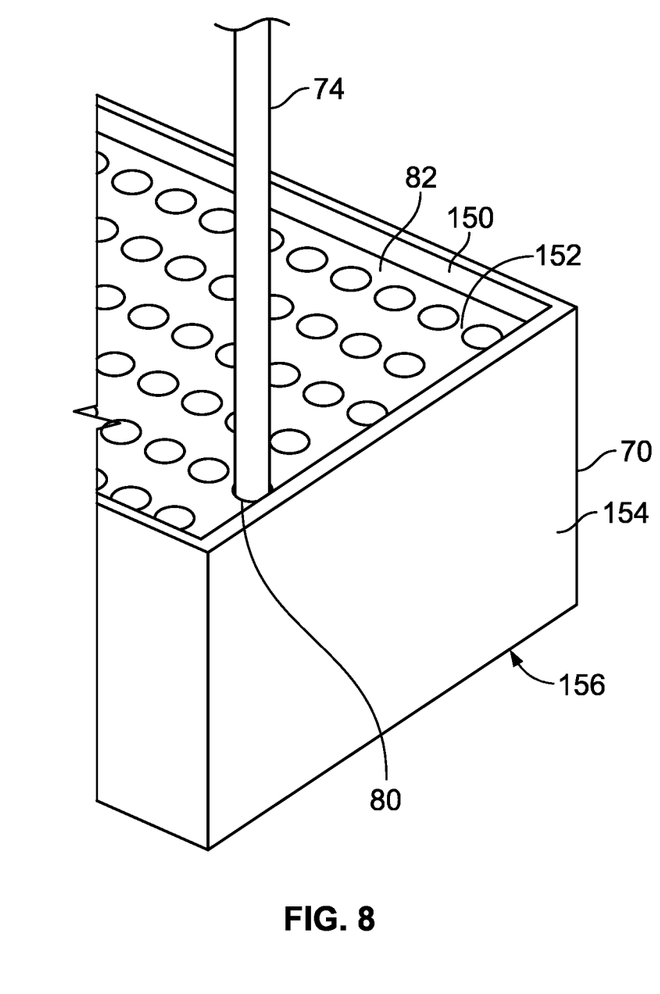
FIG. 8 is a view similar to FIG. 7 showing a tubular membrane having been advanced into one of the openings of the header plate portion.

Regarding FIG. 8, a tubular membrane 74 is shown advanced into one of the openings 80 of the plate portion 82. The inlet header 70 includes one or more side wall portions 154 that extend in an opposite direction from the curb 150 and form an interior compartment of the inlet header 70. The interior compartment 156 may be a volume that receives the fluid which the inlet header 70 then directs into the tubular membranes 74.

In some embodiments, the headers 70, 72 and fittings 102 are made of the same or different metallic and/or polymer-based materials. The tubular membrane heat exchanger 50 may have one or more components made by additive or subtractive manufacturing approaches, such as 3D printing or milling. As further examples, one or more components of the tubular membrane heat exchanger 50 may be molded.

Figure 9:
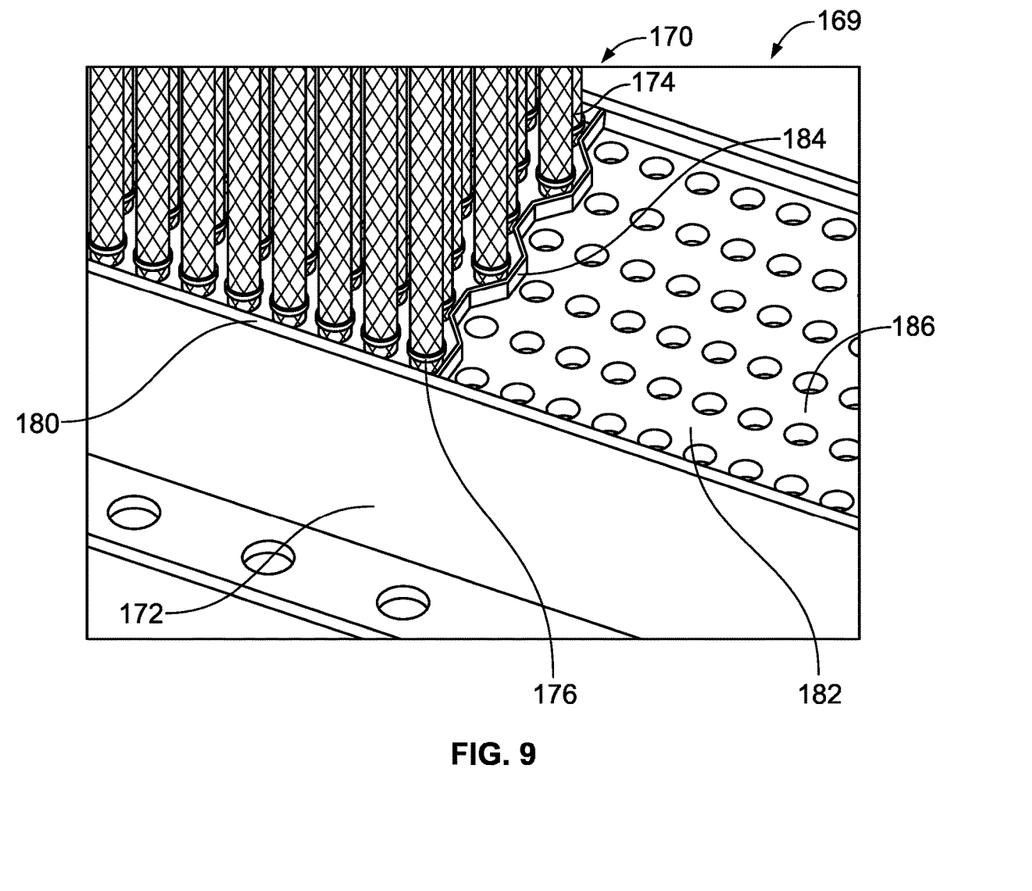
FIG. 9 is a perspective view of a header showing tubular membranes inserted into openings of a plate portion of the header before potting has been applied to the header.

Regarding FIG. 9, a portion of another tubular membrane heat exchanger 169 is provided that includes tubular membranes 170 and a header 172. FIG. 9 shows the portion of the tubular membrane heat exchanger 169 before the potting material is applied to a plate portion 182 of the header 172.

The tubular membrane heat exchanger 169 includes sleeves 174 on the outside of and supporting the tubular membranes 170. The sleeves 174 may have a woven structure with openings that permit airflow through sleeves 174. In one example, the sleeves 174 include a metallic mesh that resists deformation of the tubular membranes 170 while having openings that permit airflow into contact with the tubular membranes 170 and removal of the permeated gas near the exterior of the tubular membranes 170.

The tubular membrane heat exchanger 169 includes rubber bands 176 securing the sleeves 174 and tubular membranes 170 therein to fittings that connect the tubular membranes 170 to the header 172. In one embodiment, the fittings resemble the fittings 102 discussed above. The header 172 includes a curb 180 extending around a periphery of the plate portion 182 of the header 172. The header 172 further includes a barrier wall 184 that separates a recess 186 of the header 172 into two halves. The barrier wall 184 permits one half of the recess 186 at a time to be filled with potting material. This may make manufacturing easier because the recess 186 to be filled with potting material with a sequence of pours of potting material.

Figure 10:
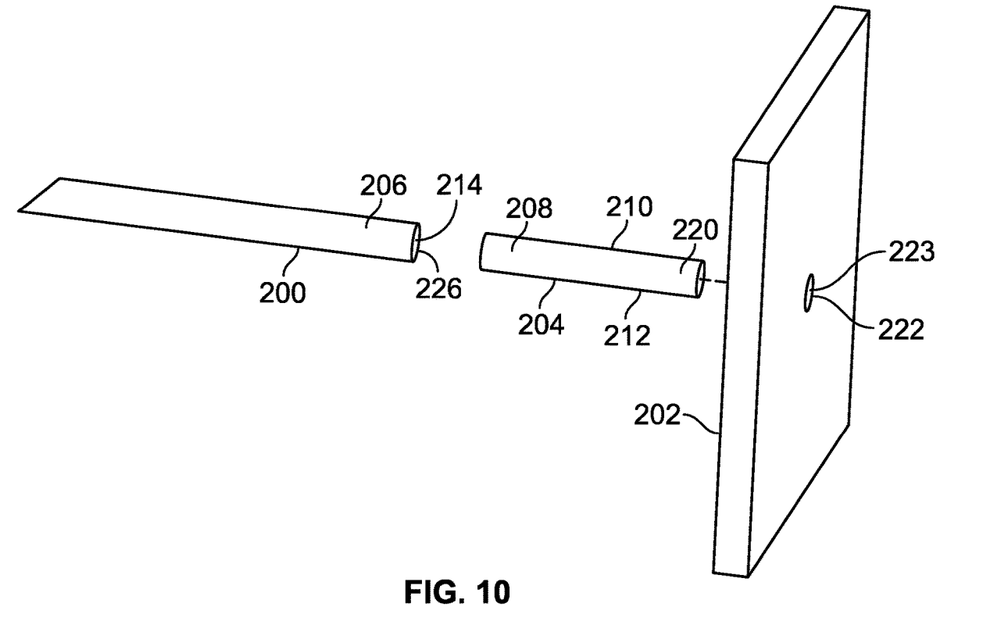
FIG. 10 is an exploded, perspective view of a tubular membrane, a fitting, and a plate portion of a header.

Regarding FIG. 10, a tubular membrane 200 is provided that connects to a header plate portion 202 via a fitting 204. In some embodiments, a sleeve may be provided around the tubular membrane 200 to support the tubular membrane 200 as discussed above with respect to FIG. 9. The fitting 204 has an end portion 208 that is sized to tightly fit into an end portion 206 of the tubular membrane 206. In one embodiment, the fitting 204 is a tube having an annular side wall 210 and a cylindrical outer surface 212 that engages a surface 223 of the opening 222. The cylindrical outer surface 212 has an outer diameter and the surface 223 has an inner diameter that are sized to form a tight fit between the fitting 204 and the plate portion 202 which inhibits liquid potting from seeping between the fitting 204 and the plate portion 202 when the potting is poured onto the plate portion 202. Further, the outer diameter of outer surface 212 may be within ±1% of an inner diameter of the tubular membrane 200. The tubular membrane 200 and fitting 204 may be configured to form a fluid-tight seal therebetween and the potting 120 reinforces the fluid-tight seal to resist pressurized fluid. In other embodiments, the tubular membrane 200 and fitting 204 may form a fluid-tight seal therebetween after the potting 120 has cured.

Figure 11:
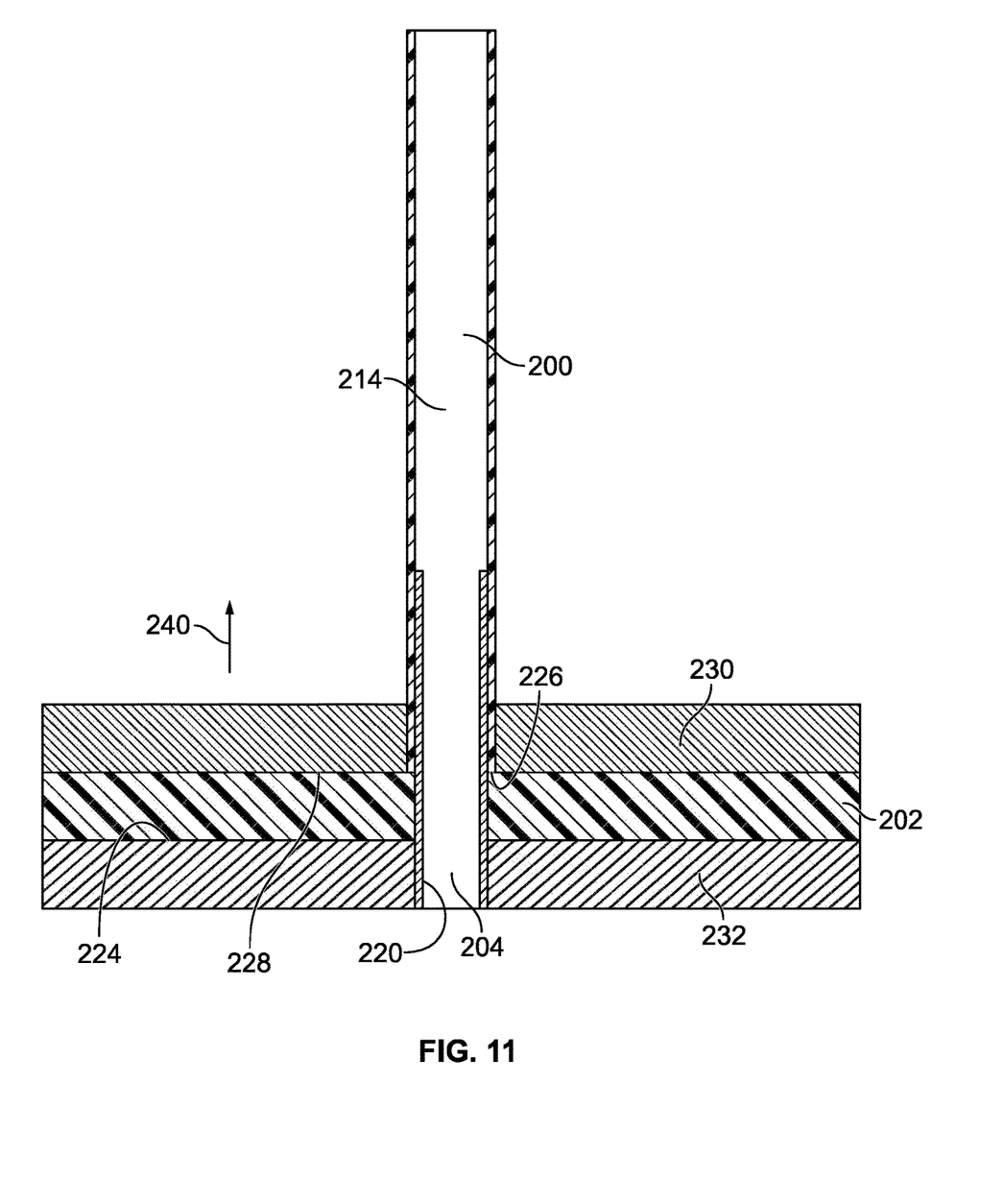
FIG. 11 is a cross-sectional view of the tubular membrane, fitting, and header plate portion of FIG. 10 assembled and having potting applied to opposite sides of the header plate portion.

With reference to FIGS. 10 and 11, the tubular membrane 200 is connected to the header plate portion 202 by advancing the end portion 208 of the fitting 204 into a lumen 214 of the tubular membrane 200. The fitting 204 may engage the tubular membrane 200 and form a fluid-tight connection therebetween. The connecting may further include advancing an opposite end portion 220 of the fitting 204 into an opening 222 of the header plate portion 202. The end portion 220 of the fitting 204 is advanced so that the end portion 220 protrudes outward from a surface 224 of the header plate portion 202. The tubular membrane 200 has an end 226 that is positioned against or near an opposite surface 228 of the header plate portion 202.

To maintain the seal between the tubular membrane 200 and fitting 204 upon the tubular membrane 200 receiving pressurized fluid, potting 230 is applied to the surface 228 of the header plate portion 202 and into contact with the tubular membrane 200. Potting 232 is also applied to the surface 224 of the header plate portion 202. The potting 232 connects to the end portion 220 of the fitting 204 to resist pull-through of the fitting 204 in direction 240. The potting 230, 232 may be made of the same or different potting materials. The potting 230, 232 may each have a depth in the range of 0.1 inches to 1 inch, such as approximately 0.25 inches or less. In one embodiment, the fitting 204 includes a thin-walled stainless steel tube.

Figure 12:
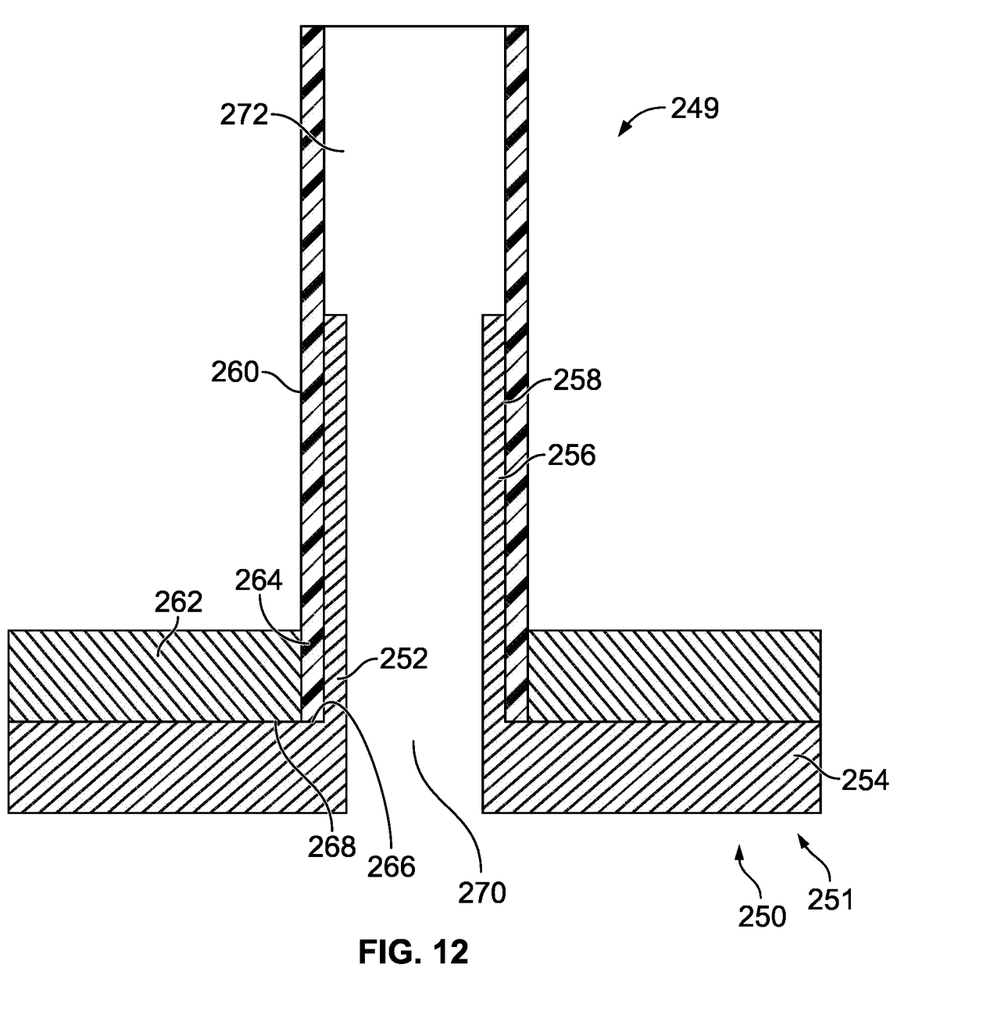
FIG. 12 is a cross-sectional view of a header having a unitary fitting and header body.

Regarding FIG. 12, a header 250 may be provided that includes a header body 251 including a fitting 252 and a header plate portion 254. The header body 251 has a unitary, one-piece construction and may be made of metallic or polymer materials. The fitting 252 may include a side wall 256 having a circular cross-section such that the side wall 256 has a cylindrical outer surface 258.

A tubular membrane 260 connects to the fitting 252 in a manner similar to the tubular membrane 200 being connected to the fitting 204 discussed above. The header 250 includes potting 262 that secures an end portion 264 of the tubular membrane 260 to the fitting 252. In one embodiment, the tubular membrane 260 has an end 266 that is contacting or near a surface 268 of the header plate portion 254. The fitting 252 has an opening 270 in communication with a lumen 272 of the tubular membrane 260 to permit fluid to travel between the tubular membrane 260 and the header 250.

The tubular membranes and fittings discussed above may have a circular cross-section in some embodiments. In other embodiments, the tubular membranes and fittings may have a variety of cross-sectional shapes including, but not limited to, obround, elliptical, teardrop, triangular, square, rectangular, or a combination thereof.

Uses of singular terms such as "a," "an," are intended to cover both the singular and the plural, unless otherwise indicated herein or clearly contradicted by context. The terms "comprising," "having," "including," and "containing" are to be construed as open-ended terms. It is intended that the phrase "at least one of" as used herein be interpreted in the disjunctive sense. For example, the phrase "at least one of A and B" is intended to encompass A, B, or both A and B.

While there have been illustrated and described particular embodiments of the present invention, it will be appreciated that numerous changes and modifications will occur to those skilled in the art, and it is intended for the present invention to cover all those changes and modifications which fall within the scope of the appended claims.

What is claimed is:

1. A method of manufacturing a heat exchanger, the method comprising:
connecting inlet end portions of tubular membranes, inlet fittings, and a body of an inlet header so that the inlet fittings extend in through openings of the body of the inlet header and the inlet end portions of the tubular membranes are adjacent an outer surface of the body of the inlet header;
applying first potting to the outer surface of the inlet header body and the inlet end portions of the tubular membranes;
connecting outlet end portions of the tubular membranes, outlet fittings, and a body of an outlet header so that the outlet fittings extend in through openings of the body of the outlet header and the outlet end portions of the tubular membranes are adjacent an outer surface of the body of the outlet header; and applying second potting to the outer surface of the outlet header body and the outlet end portions of the tubular membranes.

2. The method of claim 1 wherein connecting the inlet end portions of the tubular membranes, inlet fittings, and body of the inlet header include positioning the inlet fittings in the through openings of the body of the inlet header so that the inlet fittings contact the body of the inlet header; and Wherein connecting the outlet end portions of the tubular membranes, outlet fittings, and body of the outlet header include positioning the outlet fittings in the through openings of the body of the outlet header so that the outlet fittings contact the body of the outlet header.

3. The method of claim 1 wherein connecting the inlet end portions of the tubular membranes, inlet fittings, and body of the inlet header comprises advancing first portions of the inlet fittings into lumens of the tubular membranes and positioning second portions of the inlet fittings that are outside of the lumens in the through openings of the body of the inlet header;

wherein applying the first potting comprises applying the first potting while the second portions of the inlet fittings are in the through openings of the body of the inlet header;

wherein connecting the outlet end portions of the tubular membranes, outlet fittings, and body of the outlet header comprises advancing first portions of the outlet fittings into lumens of the tubular membranes and positioning second portions of the outlet fittings that are outside of the lumens in the through openings of the body of the outlet header; and wherein applying the second potting comprises applying the second potting while the second portions of the outlet fittings are in the through openings of the body of the outlet header.

4. The method of claim 1 wherein connecting includes positioning the entireties of the tubular membranes between the outer surface of the body of the inlet header and the outer surface of the body of the outlet header.

5. The method of claim 1 wherein applying the first potting includes applying the first potting while the tubular membranes do not extend in the through openings of the body of the inlet header.

6. The method of claim 1 wherein applying the second potting includes applying the second potting while the tubular membranes do not extend in the through openings of the body of the outlet header.

7. The method of claim 1 wherein the body of the inlet header includes an inner surface opposite the outer surface and the through openings of the inlet header body extend between the inner surface and the outer surface of the inlet header body;

wherein the body of the outlet header includes an inner surface opposite the outer surface and the through openings of the outlet header body extend between the inner surface and the outer surface of the outlet header body;

wherein connecting the inlet end portions of the tubular membranes, inlet fittings, and body of the inlet header comprises positioning inlet openings of the inlet fittings closer to the inner surface of the body of the inlet header than the outer surface; and wherein connecting the outlet end portions of the tubular membranes, outlet fittings, and body of the outlet header comprises positioning outlet openings of the inlet fittings closer to the inner surface of the body of the outlet header than the outer surface.

8. The method of claim 1 further comprising positioning inlet retainers about the inlet end portions of the tubular membranes connected to the inlet fittings; and positioning outlet retainers about the outlet end portions of the tubular membranes connected to the outlet fittings.

9. The method of claim 1 further comprising:

positioning inlet retainers about the inlet end portions of the tubular membranes adjacent the outer surface of the body of the inlet header; and positioning outlet retainers about the outlet end portions of the tubular membranes adjacent the outer surface of the body of the outlet header;

wherein applying the first potting to the outer surface of the inlet header body and the inlet end portions of the tubular membranes includes applying the first potting to the inlet retainers; and wherein applying the second potting to the outer surface of the outlet header body and the outlet end portions of the tubular membranes includes applying the second potting to the outlet retainers.

10. The method of claim 1 further comprising:

applying a third potting to an inner surface of the body of the inlet header and the inlet fittings, the through openings of the body of the inlet header extending between the outer surface and the inner surface of the body of the inlet header; and applying a fourth potting to an inner surface of the body of the outlet header and the outlet fittings, the through openings of the body of the outlet header extending between the outer surface and the inner surface of the body of the outlet header.

11. The method of claim 1 wherein connecting the inlet end portions of the tubular membranes, inlet fittings, and body of the inlet header includes connecting the inlet end portions to nipple portions of the inlet fittings and seating enlarged portions of the inlet fittings against the body of the inlet header to inhibit pull-through of the inlet fittings; and wherein connecting the outlet end portions of the tubular membranes, the outlet fittings, and the body of the outlet header includes connecting the outlet end portions to nipple portions of the outlet fittings and seating enlarged portions of the outlet fittings against the outlet header body to inhibit pull-through of the outlet fittings.

12. The method of claim 1 further comprising advancing the tubular membranes through openings of a plurality of spacers; and positioning the spacers intermediate the inlet and outlet headers along the tubular membranes.

* * * * *